June 26, 1934.  H. A. LOWE  1,964,168

TEST INDICATOR

Filed April 29, 1931

INVENTOR:
HENRY A. LOWE.
By Kwis Hudson & Kent.
ATTORNEYS.

Patented June 26, 1934

1,964,168

UNITED STATES PATENT OFFICE 1,964,168

TEST INDICATOR

Henry A. Lowe, Cleveland Heights, Ohio

Application April 29, 1931, Serial No. 533,591

1 Claim. (Cl. 33—172)

This invention relates to improvements in test indicators, that is to say instruments for testing the trueness of various kinds of surfaces, and for indicating where and to what degree a surface is out of true.

One of the objects of the invention is the provision of an instrument of this character which shall be capable of manufacture at relatively low cost without sacrificing anything in respect to accuracy.

Another object is the provision of removable and interchangeable mounting means enabling the operator to employ the instrument in connection with height gauges of well known form.

Still another object is the provision of simple and effective means for adjusting the bearings of the indicator lever so that they may have the greatest degree of rigidity consistent with bearing freedom.

Other objects and features of novelty will appear as I proceed with a description of that embodiment of the invention which, for the purposes of the present application, I have illustrated in the accompanying drawing, in which Figure 1 is an elevational view showing the invention applied to a height gauge.

Figure 3:
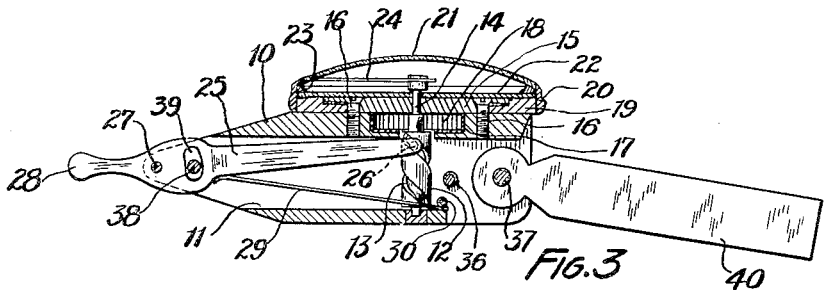
Fig. 3 is a longitudinal sectional view of the indicator taken approximately upon the line 3—3 of Fig. 2.
Figure 4:
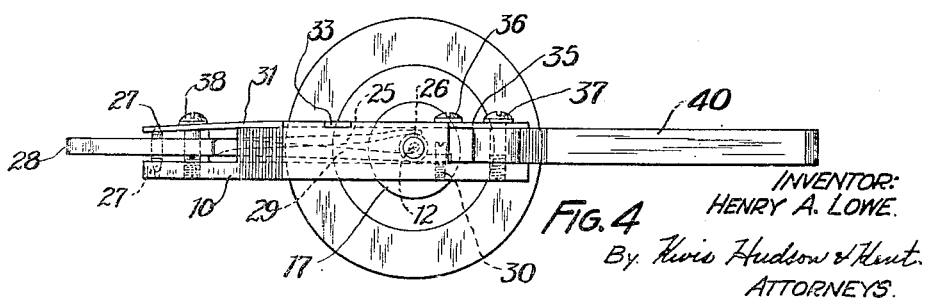
Fig. 4 is a bottom plan view of the same.

In the drawing the body member of the test indicator is shown at 10. On one side, which may be conveniently termed the front side, this body member is provided with a longitudinal recess 11 (see Fig. 3) which runs out toward the front of the instrument owing to the pointed nose thereof. In the body member there is mounted an oscillatory spindle 12 in which there is cut a spiral groove 13. Tht spindle 12 has a reduced upper portion 14 which is rotatably mounted in a circular plate 15 that is secured to the body portion 10 by screws 16 or the like. A spring barrel 17 is set into a cavity formed in the upper side of body portion 10. In this barrel is mounted a spiral spring 18 which is attached to the barrel at its outer end and to the spindle 12 at its inner end. The periphery of the circular plate 15 is undercut, as shown in Fig. 3, to form a rabbet which receives an annular tongue on the inner edge of a ring 19. An outer bezel 20 retains a crystal 21 with the aid of an inner bezel or locking ring 23. The outer bezel is made to have a tight fit upon the ring 19, and the inner bezel 23 is caused to bear firmly upon a dial 22 that rests upon the plate 15 as well as upon the ring 19. The dial 22 is therefore locked to the ring 19, and by turning the latter ring upon the plate 15 the dial 22 may be readily adjusted to locate the zero point wherever desired. On the outer end of the reduced portion 14 of the spindle there is mounted an indicator hand 24.

The indicator lever is shown at 25. It has a small lateral projection 26 at its rear end which runs within the spiral groove 13. Near its forward end the lever carries a pair of aligned trunnions 27 having tapered extremities. In practice these trunnions are made in one piece, which is tightly fitted into a drilled hole in the lever. The forward end of the lever is preferably shaped somewhat as shown in the drawing in order that there may be provided a tip 28 with a partially circular contour for engagement with the work to be tested. The longer end of the lever 25 is counterbalanced and urged toward the upper position, as shown in Fig. 3, by a leaf spring 29. This spring may be mounted in various ways, but preferably it bears loosely against the lower side of lever 25 and has its opposite extremity clamped against the bottom of the body member by a screw 30 with a tapered head.

The recess 11 in the body member is closed by a spring plate 31 which fits within the sides of the recess, except that it is provided with laterally projecting fins 32, 33, 34 and 35 which extend into correspondingly shaped notches in the body member, the depth of these notches being such as to cause the spring plate 31 to lie flush with the side of the body member. The rear end of plate 31 is held firmly in position by a screw 36 extending through a hole in the plate 31 and threaded into the body member 10, and also by a second screw 37 which likewise extends through a hole in the plate 31 and is threaded into the body member 10. The spring plate 31 in its unflexed condition may be bowed outward slightly. Means are provided for drawing its forward end inwardly, which means conveniently takes the form of a screw 38 that is threadably mounted in the body member 10 and projects through an opening 39 in the lever 25, the opening being large enough to clear the screw 38 in all positions of the lever.

The body member 10 and the spring plate 31 have tapered or conical bearing openings formed therein for the reception of the tapered trunnions 27 of the lever. By threading the screw 38 into its threaded socket in the body member 10 the head of the screw is caused to press against the forward end of spring plate 31 and flex the same, causing it to engage more closely the adjacent trunnion 37 and to force the opposite trunnion more closely into its socket in the body member. The trunnions are thereby more rigidly supported by their bearings, and the movement of the lever 25 more definitely and accurately controlled. At the same time the friction of the bearings upon the trunnions is increased. By trial however an adjustment can readily be secured which will provide the greatest possible rigidity to the mounting of the lever in its bearing, without imposing enough friction to interfere with the free and easy operation of the instrument.

Upon the screw 37 between the body 10 and the spring plate 31 there is rotatably supported a mounting shank 40. The screw 37 may be adjusted to provide the required degree of friction for holding this shank in any desired position of adjustment. By taking out the screw 37, the shank 40 may of course be removed and some other shank inserted in its place in order to facilitate the use of the indicator in connection with different pieces of apparatus. The shank herein illustrated is designed for use in connection with a height gauge 41, illustrated in Fig. 1. Gauges of this kind are customarily furnished with a scribing bar (not shown) which may be adjustably mounted upon an arm 42 by means of a slidable keeper 43 provided with a clamping screw 44. The mounting shank 40 is made of the same cross sectional dimensions as the scribing bar above referred to, and hence may be readily mounted in place of that bar in the keeper 43. When it is desired to mount the indicator upon some other device, as for example upon a tool holder, the mounting shank 40 is removed and a different shank of the proper cross sectional dimensions substituted therefor.

Figure 1:
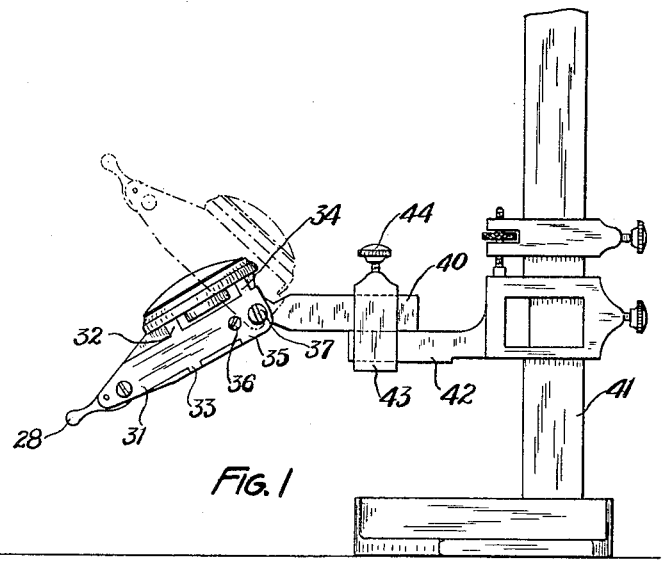
Figure 2:
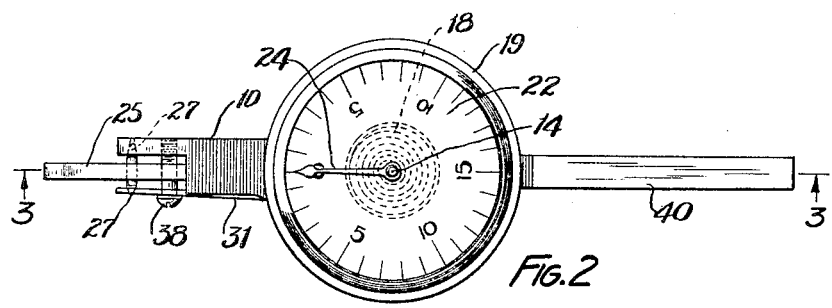
Fig. 2 is a plan view of the test indicator.

When the test indicator is in use, it is normally swung to substantially the position shown in full lines in Fig. 1, the height gauge being adjusted to bring the arm 42 to the desired level. Then the tip 28 of the lever 25 may be deflected upwardly to the limit of its movement without causing the wide portion of the lever just behind the trunnions 27 to strike the work. The instrument may also be swung upwardly as far as the dotted line position of Fig. 1, and of course may occupy any intermediate position desired.

The mechanism of the indicator operates in much the same manner as does that disclosed in my prior Patent No. 1,144,367, dated June 29, 1915, that is to say when the tip 28 of the lever is deflected upwardly by contact with a surface to be tested, the projection 26 running in the groove 13 pushes upon the lower wall of the groove to turn the spindle 12 and the pointer 24 to make an indication on the dial 22. This action winds up spring 18, and as soon as pressure is taken off of tip 28, spring 18 turns spindle 12 in the reverse direction, the lower wall of groove 13 then acting upon projection 26 to return the lever 25 to inoperative or zero position. The spring 29 merely counterbalances the lever 25, thereby lessening the amount of work which it is necessary for the spring 18 to do. Hence there is never any lost motion, such as would occur if it were necessary for the projection 26 to move crosswise of the groove from one wall thereof to the other when a change in the direction of movement of the tip 28 occurred.

In the foregoing description I have necessarily gone somewhat into detail in order to explain fully the particular embodiments of the invention herein illustrated, but I desire it to be understood that such detail disclosures are not to be construed as amounting to limitations except as they may be included in the appended claim.

Having thus described my invention, I claim:

In a test indicator, a body member recessed on one side, an operating lever mounted in said recess and projecting outwardly from the forward end of the body member, a spring plate attached to the body member covering said recess, a mounting shank extending rearwardly from the body member, said spring plate and mounting shank having aligned openings opposite the rear end of the body member, and a screw projecting through the said opening in said spring plate and through the said opening in the mounting shank and threaded into said body member, whereby the spring plate is anchored in position and the mounting shank is frictionally held in various positions of adjustment.

HENRY A. LOWE.